(12) United States Patent
Sumner et al.

(10) Patent No.: US 7,332,075 B2
(45) Date of Patent: Feb. 19, 2008

(54) WATER FILTER ASSEMBLY

(75) Inventors: Mark Christopher Sumner, Stone (GB); Paul Andrew Sumner, Stoke-on-Tient (GB)

(73) Assignee: V.A. Heating Ltd., Stoke-on-Trent (GB)

( * ) Notice: Subject to any disclaimer, the term of this patent is extended or adjusted under 35 U.S.C. 154(b) by 523 days.

(21) Appl. No.: 10/511,500

(22) PCT Filed: May 6, 2003

(86) PCT No.: PCT/GB03/00190

§ 371 (c)(1), (2), (4) Date: Oct. 15, 2004

(87) PCT Pub. No.: WO03/095365

PCT Pub. Date: Nov. 20, 2003

(65) Prior Publication Data

US 2005/0173320 A1  Aug. 11, 2005

(30) Foreign Application Priority Data

May 8, 2002  (GB) ............................... 0210423.0

(51) Int. Cl.
*B01D 35/18* (2006.01)

(52) U.S. Cl. .................. 210/184; 62/3.3; 62/440; 210/443; 210/456; 210/497.01

(58) Field of Classification Search ............. 62/3.2, 62/3.3, 3.4, 92, 389, 440; 210/149, 175–186, 210/241, 443, 456, 497.01; 222/141, 146, 222/189.06
See application file for complete search history.

(56) References Cited

U.S. PATENT DOCUMENTS

| | | | | |
|---|---|---|---|---|
| 2,406,308 | A | * 8/1946 | Stokes et al. | 210/131 |
| 3,241,677 | A | * 3/1966 | Schmitz | 210/180 |
| 4,867,102 | A | 9/1989 | Turano | |
| 5,269,919 | A | * 12/1993 | von Medlin | 210/256 |
| 6,001,249 | A | * 12/1999 | Bailey et al. | 210/232 |
| 6,058,718 | A | * 5/2000 | Forsberg et al. | 62/125 |
| 6,068,761 | A | * 5/2000 | Yuen | 210/87 |
| 6,099,735 | A | * 8/2000 | Kelada | 210/652 |
| 6,370,884 | B1 | * 4/2002 | Kelada | 62/3.64 |
| 2003/0080036 | A1 | * 5/2003 | Nguyen | 210/185 |

FOREIGN PATENT DOCUMENTS

EP  1 001 144  5/2000

OTHER PUBLICATIONS

Patent Abstracts of Japan, Publication No. 10034138, published Feb. 10, 1998.
Patent Abstracts of Japan, Publication No. 11083271, published Mar. 26, 1999.

* cited by examiner

*Primary Examiner*—Joseph Drodge
(74) *Attorney, Agent, or Firm*—Smith-Hill and Bedell

(57) ABSTRACT

A water filter assembly comprising a water filter arrangement and a water cooling arrangement in an integral unit. The cooling arrangements are concentrically configured with the cooling arrangement surrounding the filter arrangement.

13 Claims, 1 Drawing Sheet

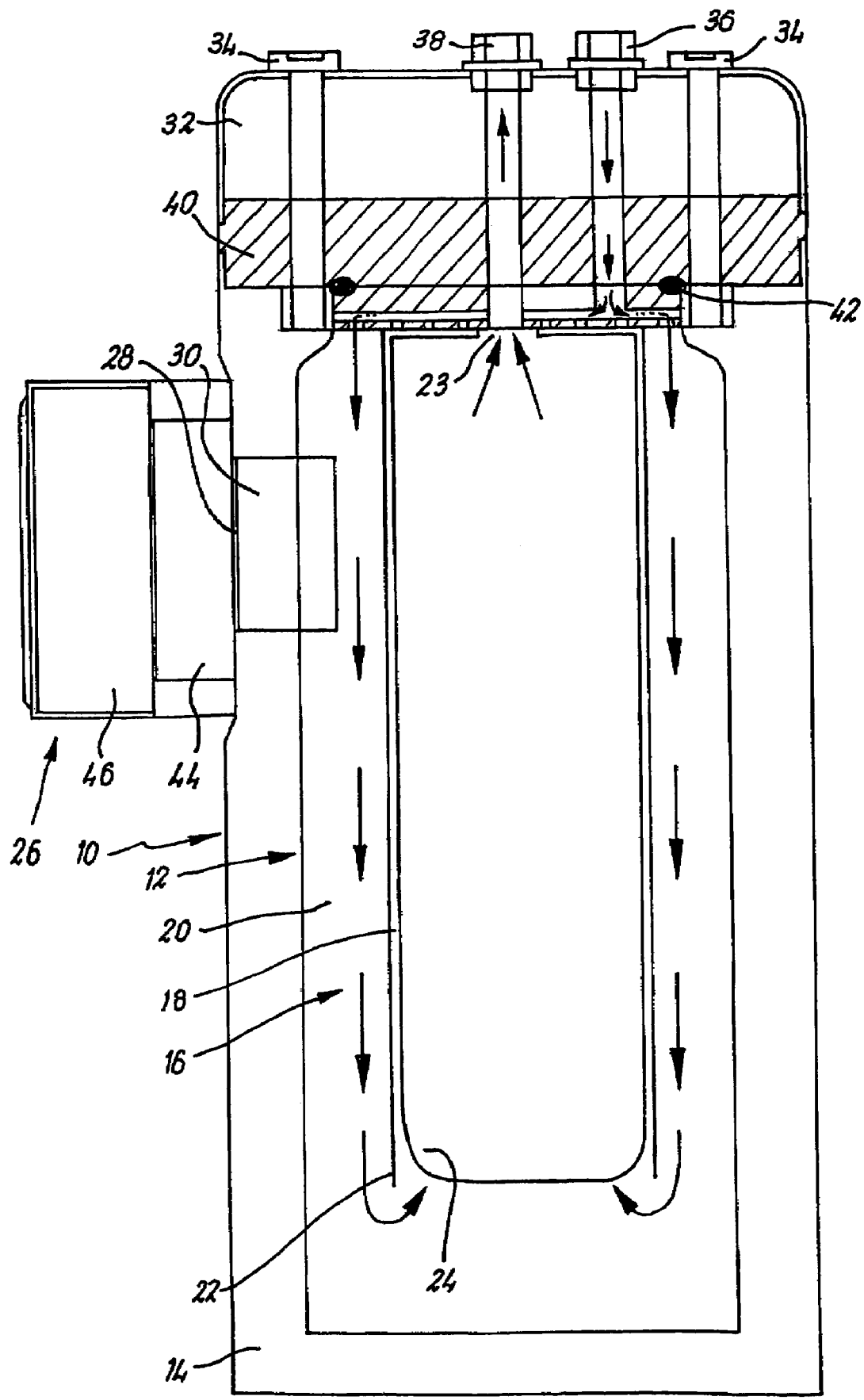

WATER FILTER ASSEMBLY

This is a national stage application filed under 35 USC 371 based on International Application No. PCT/GB2003/001900 filed May 6, 2003, and claims priority under 35 USC 119 of United Kingdom Patent Application No. 0210423.0 filed May 8, 2002.

This invention concerns water filter assemblies, and particularly water filter assemblies usable in domestic situations.

According to the present invention there is provided a water filter assembly, the assembly comprising a water filter arrangement and a water cooling arrangement in an integral unit.

The cooling arrangement preferably comprises a thermoelectric heat pump.

When used in this specification the term "thermoelectric heat pump" is to be understood as meaning a device which is an electronic device comprising a plurality of junctions between dissimilar electrical conductors. The device works by the Peltier effect in that when current is applied across the junctions this provides a warm and a cold side to the device.

The filter arrangement preferably comprises a removable filter element, which element may be made of ceramics material.

The assembly is preferably arranged so as to be connectable to a mains water supply.

The assembly may comprise a chamber with an outlet and an inlet, and means defining a flow path therebetween through the chamber, such that water passing along the flow path is cooled by the cooling arrangement.

A thermally conductive member preferably extends from the cold side of the heat pump into engagement with the flow path.

A heatsink preferably extends from the warm side of the heat pump. A fan may be provided on the warm side of the heat pump to dissipate heat therefrom, and the fan may be mounted to the heatsink.

The chamber may have a removable lid to permit removal of the filter element therefrom. The outlet and inlet may pass through the lid.

The chamber may be arranged such that water entering thereinto urges cooled water into the filter arrangement.

The cooling and filter arrangements may be concentrically configured, and preferably with the cooling arrangement surrounding the filter arrangement.

The chamber may be arranged such that water from the cooling arrangement enters the filter arrangement at one end thereof, and then passes through the length of the filter arrangement.

A thermostat may be provided in contact with water in the flow path.

An embodiment of the present invention will now be described by way of example only and with reference to the single figure of the drawings which is a diagrammatic cross-sectional view through a water filter assembly according to the invention.

The drawing shows a water filter assembly 10 which provides for cooling and filtering of water from a mains supply, and which can be connected into the mains supply such that water supplied at a tap is filtered and cooled when the assembly 10 is operative.

The assembly 10 comprises a main body 12 with an outer insulating layer 14. The layer 14 surrounds a chamber 16 divided into inner and outer portions 18, 20 by a cylindrical member 22 which is open at the lower end of the chamber 16 but closed at the upper end, except for a central opening 23. A cylindrical ceramic filter element 24 extends within the cylindrical member 22.

A cooling arrangement 26 is provided on the side of the body 12. The arrangement 26 comprises a thermoelectric heat pump 28 with its cool side innermost. A metal block 30 which in this instance is copper, extends from the cool side of the heat pump 28 to contact the outer portion 20.

A lid 32 is provided to dose off the main body 12. The lid 32 is removably mounted to the main body 12 by four equispaced bolts 34. An inlet 36 and generally central outlet 38 extend through the lid 32. A nylon member 40 is provided on the lower end of the lid 32 to aid in providing a seal against the main body 12. An O ring seal is provided around the top of the opening in the main body 12 again to assist with a seal between the lid 32 and main body 10. On the warm side of the heat pump 28 a heatsink 44 is provided with an electric fan 46 to blow air through the heatsink 44 and assist with dissipating heat therefrom.

In use, mains water enters through the inlet 36 and passes around the outside of the cylindrical member 22. As water passes the metal block 30 cooling takes place. The flow of water into the chamber 16 urges water past the cooling arrangement 26 downwardly in the outer portion 20 to pass around the lower end of the cylindrical member 22 and through the filter element 24 to pass out through the central outlet 38.

The upper ends of the inlet and outlet 36, 38 are provided with conventional fittings to readily permit mounting to a mains water supply and also removal therefrom. When it is required to replace the ceramic filter element 24 this can readily be achieved by disconnecting the water supply from the inlet and outlet 36, 38, or dosing these off. The lid 32 can then be removed by undoing the bolts 34.

There is thus described a combined water filter and cooling arrangement provided in an integral unit. This arrangement can readily be mounted for instance under a conventional domestic sink. The assembly is a relatively straightforward construction and can thus be robustly and compactly manufactured for use in such a situation.

Various modifications can be made without departing from the scope of the invention. For instance, different cooling or filtering arrangements, and particularly the latter, could be used. The cooling and/or filtering arrangements could be differently mounted.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A water filter assembly comprising:
   a vessel defining a chamber having first and second ends and an outlet and an inlet towards the first end of the chamber, with the inlet being outward of the outlet,
   a cylindrical member extending within the chamber from said first end, wherein the inlet opens into the chamber exteriorly of the cylindrical member, the outlet opens from the chamber interiorly of the cylindrical member, and the cylindrical member is shorter than the chamber and is open at the second end of the chamber such that the vessel and cylindrical member define a flow path from the inlet around the exterior of the cylindrical member to the second end of the chamber and back through the interior of the cylindrical member to the outlet, a water cooling arrangement in contact with the flow path around the exterior of the cylindrical member, the water cooling arrangement comprising a thermoelectric heat pump, and a water filter arrangement being located within the cylindrical member, whereby the water filter arrangement and the water cooling arrangement are provided in an integral unit.

2. A water filter assembly according to claim 1, wherein the thermoelectric heat pump is an electronic device comprising a plurality of junctions between dissimilar electrical conductors.

3. A water filter assembly according to claim 2, wherein the electronic device works by the Peltier effect, in that when current is applied across the junctions it provides a warm and a cold side to the electronic device.

4. A water filter assembly according to claim 1, wherein the thermoelectric heat pump, in operation, has a warm side and a cold side and the assembly further comprises a thermally conductive member that extends from the cold side of the heat pump into engagement with the flow path.

5. A water filter assembly according to claim 1, wherein the thermoelectric heat pump, in operation, has a warm side and a cold side and the assembly further comprises a heatsink that extends from the warm side of the heat pump.

6. A water filter assembly according to claim 1, wherein the thermoelectric heat pump, in operation, has a warm side and a cold side and the assembly further comprises a fan, provided on the warm side of the heat pump to dissipate heat therefrom.

7. A water filter assembly according to claim 1, wherein the thermoelectric heat pump, in operation, has a warm side and a cold side and the assembly further comprises a heatsink that extends from the warm side of the heat pump and a fan mounted on the heatsink to dissipate heat therefrom.

8. A water filter assembly according to claim 1, wherein the assembly is arranged so as to be connectable to a public utility water supply.

9. A water filter assembly according to claim 1, wherein the filter arrangement comprises a removable filter element.

10. A water filter assembly according to claim 9, wherein the removable filter element is made of ceramic material.

11. A water filter assembly according to claim 9, wherein the vessel has a removable lid to permit removal of the filter element therefrom.

12. A water filter assembly according to claim 11, wherein the outlet and inlet pass through the lid.

13. A water filter assembly according to claim 1, further comprising a thermostat in contact with the flow path.

* * * * *